United States Patent
Mehrpoo et al.

(10) Patent No.: US 12,301,264 B2
(45) Date of Patent: May 13, 2025

(54) INTERMODULATION DISTORTION SUPPRESION CIRCUIT AND METHOD

(71) Applicant: AVAGO TECHNOLOGIES INTERNATIONAL SALES PTE. LIMITED, Singapore (SG)

(72) Inventors: Mohammadreza Mehrpoo, Eindhoven (NL); Frank van der Goes, Zeist (NL); Jan Mulder, Houten (NL); Sijia Wang, Utrecht (NL)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 361 days.

(21) Appl. No.: 17/888,664

(22) Filed: Aug. 16, 2022

(65) Prior Publication Data

US 2024/0063832 A1    Feb. 22, 2024

(51) Int. Cl.
*H04B 1/00* (2006.01)
*H04B 1/04* (2006.01)

(52) U.S. Cl.
CPC ........... *H04B 1/006* (2013.01); *H04B 1/0028* (2013.01); *H04B 1/04* (2013.01)

(58) Field of Classification Search
CPC ..................................................... H04B 1/006
See application file for complete search history.

(56) References Cited

U.S. PATENT DOCUMENTS

| 3,348,125 | A | * | 10/1967 | Wieman | H03B 19/16 |
| | | | | | 327/119 |
| 3,624,514 | A | * | 11/1971 | Putzer | H03B 5/1296 |
| | | | | | 334/45 |
| 6,393,262 | B1 | * | 5/2002 | Muhlbauer | H03F 1/565 |
| | | | | | 455/107 |

* cited by examiner

*Primary Examiner* — Hsinchun Liao
(74) *Attorney, Agent, or Firm* — Foley & Lardner LLP

(57) ABSTRACT

Described herein are related to a device for communication. In one aspect, the device includes a first circuit configured to generate a first signal and a second signal at a first frequency, according to a third signal at a second frequency higher than the first frequency. The first signal and the second signal may have opposite phases with each other. In one aspect, the device includes a second circuit configured to provide a difference between the first signal and the second signal as a fourth signal. In one aspect, the device includes a third circuit configured to provide the first signal to the second circuit, and resonate at a third frequency between the first frequency and the second frequency. In one aspect, the device includes a fourth circuit configured to provide the second signal to the second circuit, and resonate at the third frequency.

20 Claims, 10 Drawing Sheets

1200

Receive first signals for transmission at a first frequency, the first signals generated based on a second signal at a second frequency higher than the first frequency
1210

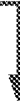

Suppress a third signal at a third frequency, the third frequency being a difference between the second frequency and the first frequency
1220

Provide a fourth signal based on the first signals at the first frequency
1230

FIG. 12

INTERMODULATION DISTORTION SUPPRESION CIRCUIT AND METHOD

FIELD OF THE DISCLOSURE

This disclosure generally relates to circuits for and methods of suppressing an intermodulation distortion.

BACKGROUND

Quality of a radio frequency (RF) signal for communication can be degraded by an intermodulation distortion. An intermodulation distortion may be a distortion of a RF signal due to an intermodulation signal generated by mixing two signals at different frequencies. Two signals at different frequencies can be mixed due to a non-linearity of a transmitter. If a frequency of the intermodulation signal is close to a frequency of the RF signal for communication, such intermodulation signal may interfere with the RF signal. If enough separation is provided between the frequency of the RF signal for communication and the frequency of the intermodulation signal, the intermodulation signal can be filtered out to protect or preserve the RF signal. However, if the frequency of the intermodulation signal and the frequency of the RF signal for communication are close to each other, then the intermodulation signal may not be able to be filtered or suppressed effectively.

SUMMARY

Various embodiments disclosed herein are related to a device for communication. In some embodiments, the device includes a first circuit configured to generate a first signal and a second signal at a first frequency, according to a third signal at a second frequency higher than the first frequency. The first signal and the second signal may have opposite phases with each other. In some embodiments, the device includes a second circuit configured to provide a difference between the first signal and the second signal as a fourth signal. In some embodiments, the device includes a third circuit configured to provide the first signal to the second circuit, and resonate at a third frequency between the first frequency and the second frequency. In some embodiments, the device includes a fourth circuit configured to provide the second signal to the second circuit, and resonate at the third frequency.

In some embodiments, the first circuit is clocked according to the third signal at the second frequency to generate the first signal and the second signal at the first frequency. In some embodiments, the third frequency is a difference between the second frequency and the first frequency.

In some embodiments, the third circuit includes a first capacitor and a first inductor coupled to each other in parallel to resonate at the third frequency. In some embodiments, the fourth circuit includes a second capacitor and a second inductor coupled to each other in parallel to resonate at the third frequency.

In some embodiments, capacitances of the first capacitor and the second capacitor are tunable.

In some embodiments, the device includes a fifth circuit coupled to the third circuit in series between the first circuit and the second circuit. The fifth circuit may be configured to resonate at a fourth frequency between the first frequency and the second frequency. In some embodiments, the device includes a sixth circuit coupled to the fourth circuit in series between the first circuit and the second circuit. The sixth circuit may be configured to resonate at the fourth frequency.

In some embodiments, the first circuit is clocked according to the third signal at the second frequency to generate the first signal and the second signal at the first frequency. In some embodiments, a difference between the second frequency and the first frequency is higher than the third frequency and lower than the fourth frequency.

In some embodiments, the first circuit is a digital to analog converter circuit, and the second circuit is a balun.

In some embodiments, the third circuit is a first transformer, and the fourth circuit is a second transformer.

Disclosed herein is related to a device for communication. In some embodiments, the device includes a first circuit including a first port configured to provide a first signal at a first frequency, and a second port configured to provide a second signal at the first frequency. In some embodiments, the device includes a second circuit including a third port configured to receive the first signal, a fourth port configured to receive the second signal, and a fifth port configured to provide a third signal corresponding to a difference between the first signal and the second signal. In some embodiments, the device includes a first inductor and a first capacitor coupled between the first port of the first circuit and the third port of the second circuit. The first inductor and the first capacitor may be configured to resonate at a second frequency different from the first frequency. In some embodiments, the device includes a second inductor and a second capacitor coupled between the second port of the first circuit and the fourth port of the second circuit. The second inductor and the second capacitor may be configured to resonate at the second frequency.

In some embodiments, the first circuit is clocked at a third frequency to generate the first signal and the second signal at the first frequency. The third frequency may be higher than the first frequency and the second frequency. The second frequency may be a difference between the third frequency and the first frequency.

In some embodiments, the device includes a third inductor and a third capacitor coupled between the first port of the first circuit and the third port of the second circuit. The third inductor and the third capacitor may be configured to resonate at a third frequency different from the first frequency. In some embodiments, the device includes a fourth inductor and a fourth capacitor coupled between the second port of the first circuit and the fourth port of the second circuit. The fourth inductor and the fourth capacitor may be configured to resonate at the third frequency.

In some embodiments, i) a third circuit including the first inductor and the first capacitor and ii) a fourth circuit including the third inductor and the third capacitor are coupled in series between the first port of the first circuit and the third port of the second circuit. In some embodiments, i) a fifth circuit including the second inductor and the second capacitor and ii) a sixth circuit including the fourth inductor and the fourth capacitor are coupled in series between the second port of the first circuit and the fourth port of the second circuit.

In some embodiments, the first circuit is clocked at a fourth frequency to generate the first signal and the second signal at the first frequency. The fourth frequency may be higher than the first frequency, the second frequency, and the third frequency. A difference between the fourth frequency and the first frequency may be higher than the second frequency and lower than the third frequency.

In some embodiments, the second circuit is a balun.

In some embodiments, the first signal and the second signal have opposite phases with each other.

In some embodiments, the first inductor and the first capacitor are part of a first transformer, and the second inductor and the second capacitor are part of a second transformer.

In some embodiments, capacitances of the first capacitor and the second capacitor are adjustable.

Various embodiments disclosed herein are related to a device for communication. In some embodiments, the device includes a first circuit configured to provide a first signal and a second signal at a first frequency. In some embodiments, the device includes a second circuit configured to provide a third signal corresponding to a difference between the first signal and the second signal. In some embodiments, the device includes a first inductor and a first capacitor configured to provide the first signal to the second circuit. In some embodiments, the device includes a second inductor and a second capacitor configured to provide the second signal to the second circuit. In some embodiments, the first inductor, the first capacitor, the second circuit, the second inductor and the second capacitor have a first impedance at a second frequency higher than the first frequency, and a second impedance at a third frequency higher than the second frequency. The second impedance may be higher than the first impedance.

In some embodiments, the first inductor, the first capacitor, the second circuit, the second inductor and the second capacitor have a third impedance at the first frequency. The third impedance may be higher than the first impedance.

In some embodiments, the first circuit is clocked at a fourth frequency higher than the third frequency to generate the first signal and the second signal at the first frequency. The third frequency may be a difference between the fourth frequency and the first frequency.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 12 is a flow diagram showing operations for suppressing intermodulation distortion, in accordance with some embodiments.

Figure 1:
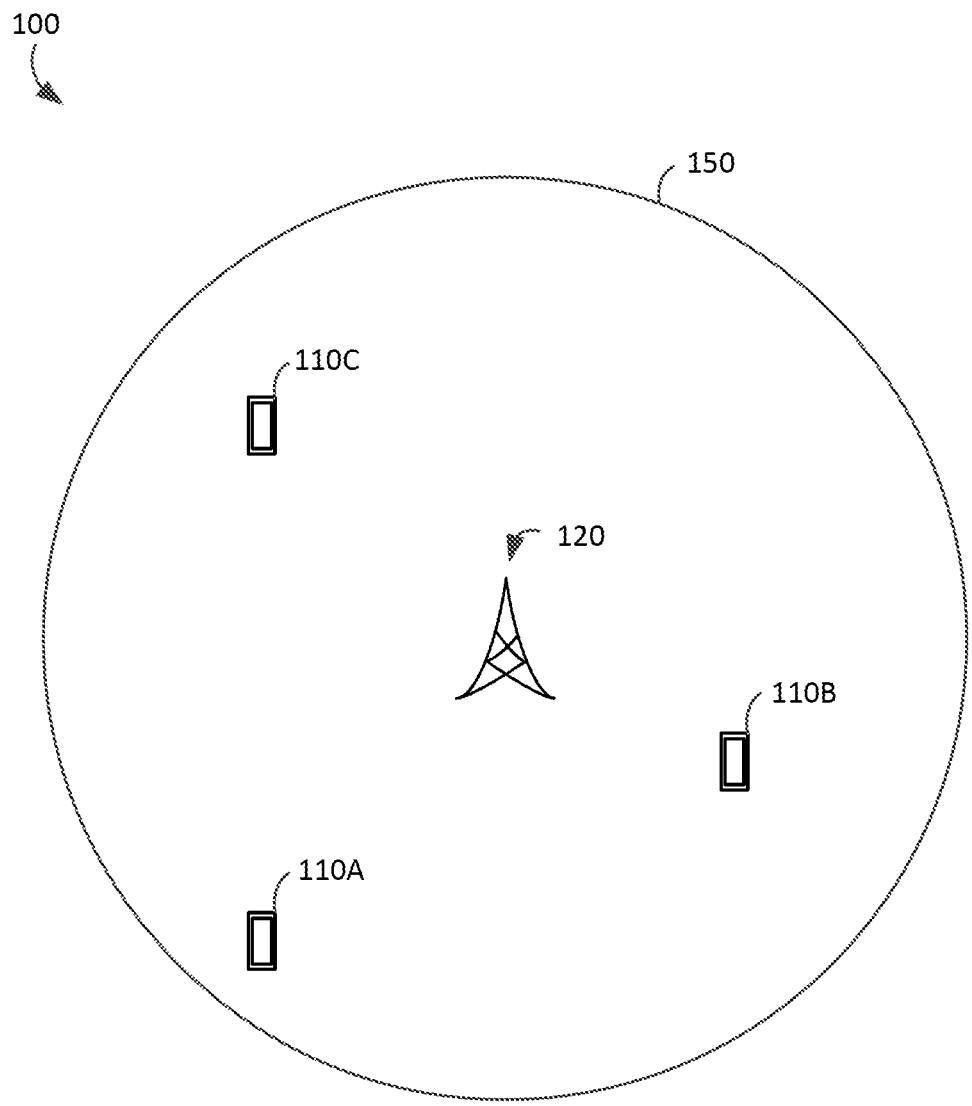
FIG. 1 is a block diagram of a communication system including a base station and client devices, in accordance with some embodiments.

The details of various embodiments of the methods and systems are set forth in the accompanying drawings and the description below.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over, or on a second feature in the description that follows may include embodiments in which the first and second features are formed in direct contact and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" "top," "bottom" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Disclosed herein are related to circuits for and methods of suppressing a distortion for a transmitter. The distortion may be an intermodulation distortion due to an intermodulation signal. An intermodulation signal may be caused or generated by mixing two signals at different frequencies or converting a signal. Two signals may include a RF signal for transmission and an image signal of the RF signal. An image signal may be a signal at a frequency corresponding to a difference between i) a clock frequency of a clock signal and ii) a frequency of a RF signal for transmission. The RF signal for transmission and the image signal may be mixed, because of a non-linearity of the transmitter. In one aspect, one or more resonating circuits can be provided to suppress or reduce an intermodulation distortion. A resonating circuit may include an inductor and a capacitor tuned or set to resonate at a frequency of the image signal. The resonating circuit may provide a high impedance at the frequency of the image signal, such that an intermodulation between the image signal and the RF signal can be reduced or obviated. By reducing the intermodulation between the image signal and the RF signal for transmission, the intermodulation distortion can be reduced, and the quality of the RF signal can be preserved or improved.

In one aspect, the transmitter is implemented for a radio frequency (RF) communication, such as a cellular communication (3G, 4G, 5G, 6G, etc.), Wi-Fi communication, Bluetooth communication etc. In some embodiments, the transmitter is a transmitter of a base station (e.g., eNode B (eNB), gNodeB (gNB), etc.) that provides a wireless communication. In one aspect, the transmitter includes or is implemented as a digital to analog converter (DAC) operating at a high speed (e.g., over 5 Giga samples per second). The DAC may convert a modulated signal at RF in a digital representation into an analog signal in an analog representation. The DAC may provide the analog signal to a preamplifier or a power amplifier for transmission through an antenna, such that an analog upconverter or an analog mixer can be omitted. By omitting the analog upconverter or the analog mixer, the transmitter can reduce power consumption, improve linearity, provide design flexibility, and can be implemented in a small form factor. Moreover, modulation or upconversion of a signal in a baseband frequency (e.g., 100 MHz~1 GHz) to a RF frequency (e.g., 1~10 GHz) can be performed by a digital logic circuit that may be less susceptible to noise than an analog circuit, such that the transmitter can improve a signal quality. In some embodiments, the DAC is provided in an integrated circuit package (e.g., multichip module or single chip package). Although the DAC disclosed herein is provided for a transmitter for a wireless communication, the DAC can be implemented for different applications. For example, the DAC disclosed herein can be implemented for a wired communication, an optical communication, or any computing device that performs a high speed digital-to-analog conversion.

In some embodiments, the DAC provides differential signals as outputs. Differential signals may have opposite phases to represent a signal, data or information to provide. For example, a first differential signal may have a first voltage corresponding to a sum of i) a common mode voltage and ii) a data voltage corresponding to data or information to provide, and a second differential signal may have a second voltage corresponding to a difference between i) the common mode voltage and ii) the data voltage. In one aspect, differential signals may reject or alleviate common mode noise. Common mode noise may be noise added to the common mode voltage or noise added to the differential signals equally. In some embodiments, the differential signals can be converted into a single ended signal. For example, a balun can obtain a difference between i) the first voltage of the first differential signal and ii) the second voltage of the second differential signal, as a voltage of the single ended signal. Ideally, the voltage of the single ended signal is or corresponds to twice of the data voltage without the common mode voltage. However, due to an imbalance or a mismatch of generating the differential signals, the common mode voltage may affect or influence the single ended signal. For example, due to a non-linearity of the DAC, an intermodulation of a common mode voltage of an image signal may degrade or distort the single ended signal output by the balun. In one aspect, one or more resonating circuits can be implemented between the DAC and the balun. The one or more resonating circuits may be set or tuned to resonate at a frequency of an image signal to provide a high impedance at the frequency of the image signal. By implementing the one or more resonating circuits that resonate at the frequency of the image signal, an intermodulation of the image signal can be obviated or reduced, such that a quality of the single ended signal from the balun can be preserved, despite the non-linearity or the imbalance of the DAC.

FIG. 1 is a block diagram of a communication system 100 including a base station 120 and client devices 110A, 110B, 110C, in accordance with some embodiments. The base station 120 and the client devices 110A, 110B, 110C may communicate through a wireless communication link. A wireless communication link may be a cellular communication link conforming to 3G, 4G, 5G, 6G, or other cellular communication protocols. In one aspect, the client devices 110A . . . 110C are located within a geographical boundary 150 with respect to the base station 120, and may communicate with or through the base station 120. In some embodiments, the communication system 100 includes more, fewer, or different number of base stations 120 and/or client devices 110 than shown in FIG. 1.

In some embodiments, the client device 110 may be a user device such as a mobile phone, a smart phone, a personal digital assistant (PDA), tablet, laptop computer, wearable computing device (e.g., head mounted display, smart watch), etc. A client device 110 may be also referred to as user equipment (UE). Each client device 110 may communicate with the base station 120 through a corresponding communication link. For example, the client device 110 may transmit or provide a wireless signal at RF to a base station 120 through a wireless communication link (e.g., 3G, 4G, 5G, 6G or other cellular communication link), and/or receive a wireless signal at RF from the base station 120 through the wireless communication link (e.g., 3G, 4G, 5G, 6G or other cellular communication link). A wireless signal may be a signal exchanged or provided through a wireless medium (e.g., air). The wireless signal may include or carry data such as audio data, image data, text, etc.

In some embodiments, the base station 120 may be a device configured to provide a wireless communication to client devices 110 within a geographical boundary 150. Examples of the base station 120 include eNB, gNB, etc. The base station 120 may be communicatively coupled to another base station 120 or other communication devices through a wireless communication link and/or a wired communication link. The base station 120 may receive a wireless signal at RF from a client device 110 or another base station 120 through a wireless communication link. Additionally or alternatively, the base station 120 may transmit or provide a wireless signal at RF to another client device 110, another base station 120, or another communication device through a wireless communication link. Hence, the base station 120 allows communication among client devices 110 associated with the base station 120, or other client devices 110 associated with different base stations 120.

Figure 2:
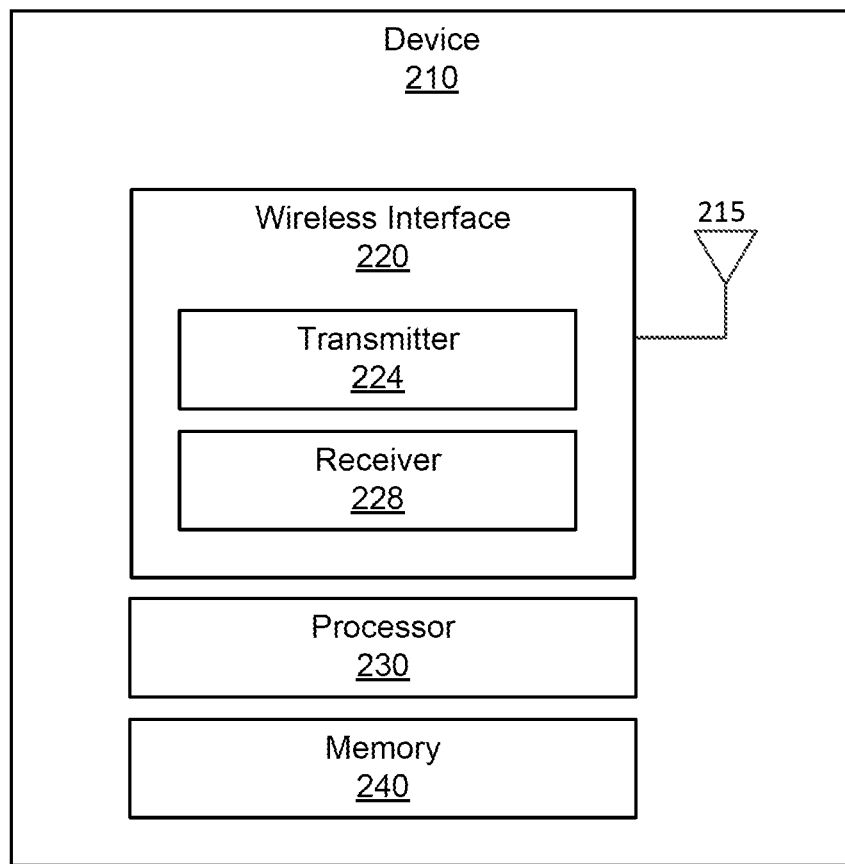
FIG. 2 is a block diagram of a device for communication through a wireless communication link, in accordance with some embodiments.

FIG. 2 is a block diagram of a device 210 for communication through a wireless communication link, in accordance with some embodiments. In some embodiments, the device 210 may be the base station 120, the client device 110, or any device that can communicate through a wireless communication link. In some embodiments, the device 210 includes an antenna 215, a wireless interface 220, a processor 230, and a memory device 240. These components may be embodied as hardware, software, firmware, or a combination thereof. In some embodiments, the device 210 includes more, fewer, or different components than shown in FIG. 2. For example, the device 210 may include an electronic display and/or an input device. For example, the device 210 may include additional antennas 215 and additional wireless interfaces 220 than shown in FIG. 2.

In some embodiments, the antenna 215 is a component that may receive a wireless signal at RF and/or transmit a wireless signal at RF through a wireless medium (e.g., air). The antenna 215 may be a dipole antenna, a patch antenna, a ring antenna, or any suitable antenna for wireless communication. In one aspect, a single antenna 215 is utilized for both transmitting a wireless signal and receiving a wireless signal. For receiving a wireless signal, the antenna 215 may detect a wireless signal having a change in an electromagnetic wave in a wireless medium (e.g., air), and provide, to the wireless interface 220, an electrical signal at RF having a voltage and/or a current corresponding to the detected change in the electromagnetic wave. An electrical signal at RF may be referred to as a RF signal herein. For transmitting a wireless signal, the antenna 215 may receive, from the wireless interface 220, an electrical signal at RF having a voltage and/or a current, and transmit, through the wireless medium (e.g., air), a wireless signal having a change in an electromagnetic wave corresponding to the electrical signal. In some embodiments, different antennas 215 can be utilized for transmitting the wireless signal and receiving the wireless signal. In some embodiments, multiple antennas 215 can be utilized to support multiple-in, multiple-out (MIMO) communication.

In some embodiments, the wireless interface 220 is a circuit or a component that may provide a RF signal to the antenna 215 or receive a RF signal from the antenna 215. In some embodiments, the wireless interface 220 includes a transmitter 224 and a receiver 228. In some embodiments, the transmitter 224 and the receiver 228 may be implemented in a same integrated circuit. In some embodiments, the transmitter 224 and the receiver 228 may be implemented in different integrated circuits. A transmitter 224 may be a circuit or a component that generates or provides a RF signal for transmitting data. In one aspect, the transmitter 224 may receive a baseband signal including or representing data (e.g., audio data, image data, text, or any data) for transmission at a baseband frequency (e.g., 0~1 GHz) from the processor 230, and upconvert the baseband signal to generate a RF signal. The transmitter 224 may provide the RF signal to an antenna 215 for transmission. A receiver 228 may be a circuit or a component that receives a RF signal for receiving data. In one aspect, the receiver 228 may receive a RF signal at the RF from an antenna 215, and downconvert the RF signal to a baseband frequency (e.g., 0~1 GHz) to obtain a downconverted signal at the baseband frequency. The downconverted signal at the baseband frequency may include or represent data (e.g., audio data, image data, text, or any data) generated by another device (e.g., another base station 120, another client device 110, etc.). The receiver 228 may provide the downconverted signal to the processor 230. In one configuration, the transmitter 224 and the receiver 228 may be coupled to the same antenna 215. In one configuration, the transmitter 224 and the receiver 228 may be coupled to different antennas 215.

The processor 230 is a component that processes data. The processor 230 may be embodied as FPGA, ASIC, a logic circuit, etc. The processor 230 may obtain instructions from the memory device 240, and execute the instructions. In one aspect, the processor 230 may receive the downconverted signal at the baseband frequency from the wireless interface 220, and decode or process data included in or represented by the downconverted signal. For example, the processor 230 may obtain audio data or image data from the downconverted signal. In one aspect, the processor 230 may generate or obtain data for transmission at the baseband frequency, and encode or process the data. For example, the processor 230 may encode or process image data or audio data at the baseband frequency, and provide a baseband signal including or representing the encoded or processed data to the wireless interface 220 for transmission.

The memory device 240 is a component that stores data. The memory device 240 may be embodied as RAM, flash memory, ROM, EPROM, EEPROM, registers, a hard disk, a removable disk, a CD-ROM, or any device capable for storing data. The memory device 240 may be embodied as a non-transitory computer readable medium storing instructions executable by the processor 230 to perform various functions of the device 210 disclosed herein. In some embodiments, the memory device 240 and the processor 230 are integrated as a single component (or an integrated circuit). In some embodiments, the memory device 240, the processor 230, and the wireless interface 220 are integrated as a single component (or an integrated circuit). In some embodiments, the memory device 240, the processor 230, and the wireless interface 220 are implemented as discrete components (or separate integrated circuits).

Figure 3:
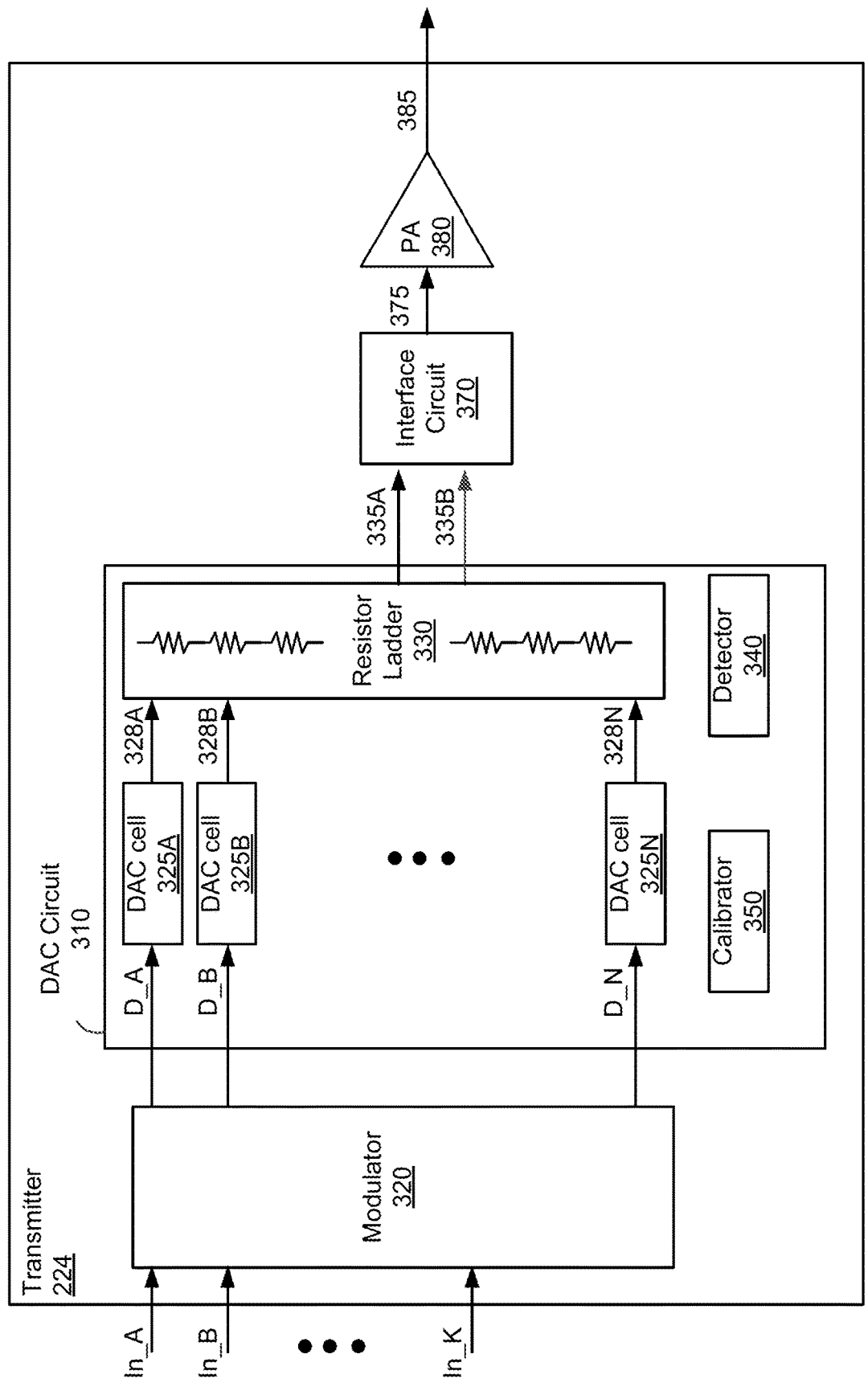
FIG. 3 is a schematic block diagram of a transmitter, in accordance with some embodiments.

FIG. 3 is a schematic block diagram of a transmitter 224, in accordance with some embodiments. In some embodiments, the transmitter 224 includes a DAC 310 (also referred to as "a DAC circuit 310"), a modulator 320, an interface circuit 370, and a power amplifier (PA) 380. These components may operate together to generate a RF signal 385 for transmission. In one aspect, the modulator 320 operates in a digital domain, where the interface circuit 370 and the PA 380 operate in an analog domain. The DAC circuit 310 may operate in both the analog domain and the digital domain, and may operate as an interface between the modulator 320 operating in the digital domain and the interface circuit 370 and the PA 380 operating in the analog domain. In some embodiments, the transmitter 224 includes more, fewer, or different components than shown in FIG. 3. For example, the modulator 320 may be implemented as part of the processor 230.

In some embodiments, the modulator 320 is a circuit or a component that may receive a baseband signal including K-bit data In_A . . . In_K in a digital representation, and perform modulation or upconversion on the K-bit data In_A . . . In_K. A modulation or an upconversion may be multiplying a value represented by the K-bit data In_A . . . In_K by a sine function or a cosine function of a carrier frequency at RF. A carrier frequency may be a frequency (e.g., 2~60 GHz), at which a wireless signal can be transmitted. In one approach, the modulator 320 can perform multiplication of the value represented by the K-bit data In_A . . . In_K and the sine function or the cosine function of the carrier frequency by a digital logic circuit to obtain N-bit data D_A . . . D_N representing an upconverted signal at RF. The modulator 320 may provide the N-bit data D_A . . . D_N in a digital representation to the DAC circuit 310.

In some embodiments, the DAC circuit 310 is a circuit or a component that may perform a digital-to-analog conversion. In some embodiments, the DAC circuit 310 includes a plurality of DAC cells 325A . . . 325N, a resistor ladder 330, a detector 340, and a calibrator 350. These components may operate together to receive N-bit data D_A . . . D_N in a digital representation, and provide signals 335A, 335B in an analog representation corresponding to the N-bit data D_A . . . D_N. For example, voltage amplitudes of the signals 335A, 335B may represent or correspond to a value of the N-bit data D_A ... D_N. In some embodiments, the DAC circuit 310 includes more, fewer, or different components than shown in FIG. 3.

In some embodiments, a DAC cell 325 is a circuit or a component that may receive one bit data D, and generate a current 328 corresponding to the one bit data D. In one configuration, the DAC cell 325 includes an input port coupled to the modulator 320, and an output port coupled to a corresponding resistor of the resistor ladder 330. A port may be a pad, a metal rail, or any conductive component that can receive or provide an electrical signal (e.g., a voltage or a current). An input port may be a port to receive a signal, where an output port may be a port to provide or output a signal. In this configuration, a DAC cell 325 may receive a one bit data D, and provide a current 328 having an amplitude corresponding to the one bit data D. For example, in response to the one bit data D having a value '0', the DAC cell 325 may bypass providing a current. For example, in response to the one bit data D having a value '1', the DAC cell 325 may provide a current 328 having a certain amplitude to the resistor ladder 330.

In some embodiments, the resistor ladder 330 is a circuit or a component that can provide voltage signals 335A, 335B corresponding to currents 328A ... 328N from a set of DAC cells 325A ... 325N. In one configuration, the resistor ladder 330 includes various resistors connected in a R-2R configuration. In one configuration, output ports of different DAC cells 325A can be coupled to corresponding resistors of the resistor ladder 330. In one configuration, the resistor ladder 330 includes output ports coupled to input ports of the interface circuit 370. In this configuration, the resistor ladder 330 can combine currents 328A ... 328N from the set of DAC cells 325, and generate or provide voltage signals 335A, 335B corresponding to the combined current. The voltage signals 335A, 335B may be differential signals having opposite phases with each other. In one aspect, an amplitude of the combined current corresponds to amplitudes of the voltage signals 335A, 335B. For example, for '0001' of 4-bit input data corresponding to a value '1', a difference in amplitudes of the voltage signals 335A, 335B may be 100 mV corresponding to a current from a single DAC cell 325. For example, for '0111' of 4-bit input data corresponding to a value '3', a difference in amplitudes of the voltage signals 335A, 335B may be 300 mV corresponding to currents from three DAC cells 325. The resistor ladder 330 may provide the voltage signals 335A, 335B at its output ports.

In some embodiments, the detector 340 is a circuit or a component that may detect an error in one or more DAC cells 325. The detector 340 can be implemented as an analog circuit, a digital logic circuit, or a combination of the analog circuit and the digital logic circuit. In one configuration, the detector 340 includes one or more input ports coupled to the resistor ladder 330, and an output port coupled to an input port of the calibrator 350. In this configuration, the detector 340 can detect characteristics of one or more DAC cells 325. Examples of characteristics of a DAC cell 325 include a timing of providing a current 328, an amplitude of the current 328, etc. The detector 340 may generate one or more feedback signals indicating the detected characteristics of a DAC cell 325, and provide the one or more feedback signals to the calibrator 350.

In some embodiments, the calibrator 350 is a circuit or a component that can perform calibration of DAC cells 325. In one aspect, each DAC cell 325 may have errors due to a process corner variation, a voltage variation, a temperature variation, or a combination of them. Examples of errors may include a timing error and an amplitude error. For example, timing errors or differences in timing of providing currents 328A ... 328N by different DAC cells 325 can cause errors in combining currents 328A ... 328N from different DAC cells 325, and may cause inaccuracy in generating the voltage signals 335A, 335B corresponding to N-bit data. For example, if a particular DAC cell 325 provides a current 328 later than other DAC cells 325 or does not provide a current 328 at a time period allocated for providing the current 328, then the current 328 from the DAC cell 325 may not be combined properly, and may cause the amplitudes of the voltage signals 335A, 335B to represent a wrong value of a N-bit data. For example, amplitude errors or differences in amplitudes of currents 328A ... 328N provided by different DAC cells 325A ... 325N can cause errors in an amplitude of the combined current from different DAC cells 325A ... 325N, and may cause inaccuracy in amplitudes of the voltage signals 335A, 335B generated based on the combined current. For example, if a particular DAC cell 325 provides a current 328 having an amplitude less than or larger than amplitudes of currents 328 from other DAC cells 325, then the amplitudes of the voltage signals 335A, 335B generated based on the combined current may represent a wrong value of a N-bit data. In one aspect, the calibrator 350 can configure or adjust each DAC cell 325 to reduce timing errors and amplitude errors.

In one aspect, the calibrator 350 may receive one or more feedback signals indicative of characteristics of one or more DAC cells 325 from the detector 340, and adjust a configuration or setting of each DAC cell 325 according to the one or more feedback signals. Examples of configuration or setting of a DAC cell 325 include a configuration to adjust a drive strength of generating or providing the current 328 and/or a configuration to adjust an amplitude of the current 328. The calibrator 350 may determine a target configuration or a target setting of each DAC cell 325, and provide a configuration signal indicating the determined configuration or setting to each DAC cell 325. For example, if the calibrator 350 determines, based on one or more feedback signals, that a particular DAC cell 325 is slower than other DAC cells 325, the calibrator 350 may generate a configuration signal causing the DAC cell 325 to increase a drive strength to provide the current 328 faster. For example, if the calibrator 350 determines, based on one or more feedback signals, that a particular DAC cell 325 provides a current 328 with an amplitude larger than amplitudes of currents 328 provided by other DAC cells 325, the calibrator 350 may generate a configuration signal causing the DAC cell 325 to provide the current 328 with a lower amplitude.

In some embodiments, the interface circuit 370 is a circuit or a component that may interface between the DAC circuit 310 and the PA 380. Examples of the interface circuit 370 include a balun, an impedance matching circuit, etc. In one configuration, the interface circuit 370 includes a first input port coupled to a first output port of the resistor ladder 330, a second input port coupled to a second output port of the resistor ladder 330, and an output port coupled to an input port of the PA 380. In this configuration, the interface circuit 370 may convert differential signals 335A, 335B into a signal 375. For example, the interface circuit 370 may obtain a difference in amplitudes of the signals 335A, 335B, and provide the difference as the signal 375. In one aspect, the interface circuit 370 may provide impedance matching between the DAC circuit 310 and the PA 380, such that the input port of the PA 380 may have a certain impedance within a range (e.g., 40~60 ohm) to ensure that the PA 380 can operate properly.

In some embodiments, the PA 380 is a circuit or a component that can amplify the signal 375 to obtain the RF signal 385 for driving the antenna 215. In some embodiments, the PA 380 includes a single amplifier circuit or two or more amplifier circuits connected in cascade. In one configuration, the PA 380 includes an input port coupled to an output port of the interface circuit 370, and an output port coupled to the antenna 215. In this configuration, the PA 380 can amplify an amplitude of the signal 375 to obtain the RF signal 385 having an amplified amplitude, and provide the RF signal 385 to the antenna 215 for transmission.

Figure 4:
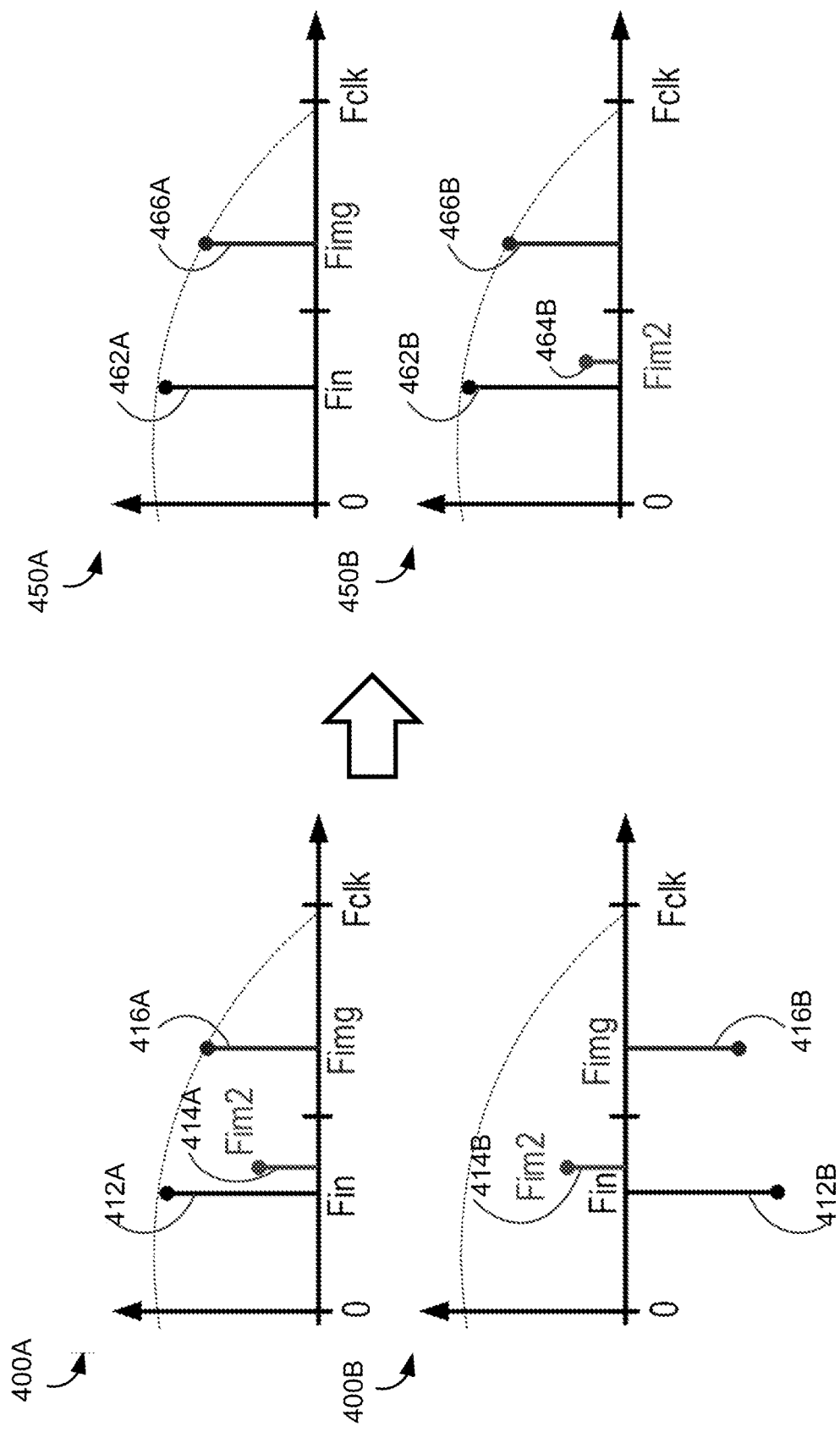
FIG. 4 is a diagram showing frequency plots of various signals of a transmitter.

FIG. 4 is a diagram showing frequency plots 400A, 400B, 450A, 450B of various signals of a transmitter. The transmitter may be the transmitter 224. The plot 400A may show a frequency plot of the signal 335A from the DAC circuit 310, and the plot 400B may show a frequency plot of the signal 335B from the DAC circuit 310. The plot 450A may show a frequency plot of the signal 375 from the interface circuit 370, when the signals 335A, 335B are balanced or matched. The plot 450B may show a frequency plot of the signal 375 from the interface circuit 370, when the signals 335A, 335B are not balanced or not matched. The signals 335A, 335B may be differential signals. The signals 335A, 335B may be matched or balanced, when the signal 335A is a sum of i) a common mode voltage and ii) a data voltage corresponding to data or information to provide, and the signal 335B is a difference between i) the common mode voltage and ii) the data voltage. The signals 335A, 335B may be not matched or not balanced, when the signal 335A is offset from a sum of i) a common mode voltage and ii) a data voltage corresponding to data or information to provide, and/or the signal 335B is offset from a difference between i) the common mode voltage and ii) the data voltage.

As shown in the plot 400A, the signal 335A may include or may be a combination of signals 412A, 414A, 416A at a RF frequency Fin, an intermodulation frequency Fim2, and an image frequency Fimg, respectively. The RF frequency Fin may be a frequency (e.g., 400 MHz~7.2 GHz) of RF signals 412A, 412B including or representing data for transmission. The image frequency Fimg may be a frequency of an image signal 416A of the RF signal 412A with respect to a clock signal. A clock signal may be a signal, based on which the DAC circuit 310 may operate or may be clocked to generate the signals 335A, 335B. A clock frequency Fclk may be a frequency (e.g., 16~20 GHz) of the clock signal. The clock frequency may be higher than the frequency Fin. The image frequency Fimg may be a difference between i) the clock frequency Fclk of the clock signal, and ii) the RF frequency Fin of the RF signals 412A, 412B. The intermodulation signal 414A at the intermodulation frequency Fim2 may be a second order intermodulation product of intermodulation between the image signal 416A and the RF signal 412A. The intermodulation may occur due to nonlinearity of the DAC circuit 310 (e.g. non-linearity of output cascode transistor(s), nonlinearity of termination resistor(s), nonlinearity of capacitor(s), etc.). The intermodulation frequency Fim2 may be a difference between the image frequency Fimg and the RF frequency Fin.

As shown in the plot 400B, the signal 335B may include or may be a combination of signals 412B, 414B, 416B at the RF frequency Fin, the intermodulation frequency Fim2, and the image frequency Fimg, respectively. The signals 412B, 414B, 416B may be similar to the signals 412A, 414A, 416A of the signal 335A, except the signals 412A, 412B at the RF frequency Fin have opposite polarities (or opposite phases) and the signals 416A, 416B at the image frequency Fimg have opposite polarities (or opposite phases). The signals 414A, 414B at the intermodulation frequency Fim2 may have the same polarity (or same phase), because the signals 414A, 414B may correspond to a common mode voltage of intermodulation between the image signals 416A, 416B and the RF signals 412A, 412B.

As shown in the plot 450A, if the signals 335A, 335B are balanced or matched, the signal 375 may have or may be a combination of signals 462A, 466A at the RF frequency Fin, and the image frequency Fimg, respectively. The signal 462A at the RF frequency Fin may correspond to a difference between the signals 412A, 412B, and the signal 466A may correspond to a difference between the signals 416A, 416B. If the signals 416A, 416B at the image frequency Fimg and the signals 412A, 412B at the RF frequency Fin are balanced or matched in terms of phase and amplitude, the signals 414A, 414B can be cancelled out.

As shown in the plot 450B, if the signals 335A, 335B are not balanced or not matched, the signal 375 may have or may be a combination of signals 462B, 464B, 466B at the RF frequency Fin, the intermodulation frequency Fim2, and the image frequency Fimg, respectively. The signal 462B may be similar to the signal 462A, and the signal 466B may be similar to the signal 466A. The signal 464B may correspond to a difference between the signals 414A, 414B at the intermodulation frequency Fim2. In one aspect, the signal 375 may have the signal 464B at the intermodulation frequency Fim2, because of a mismatch or imbalance of the signals 335A, 335B, such that the signals 414A, 414B at the intermodulation frequency Fim2 are not cancelled out. In one aspect, the image frequency Fimg of the signals 466A, 466B may be separated from the RF frequency Fin of the signals 462A, 462B, such that the signals 466A, 466B can be filtered out. However, the intermodulation frequency Fim2 of the signal 464B may be close to the RF frequency Fin of the signals 462A, 462B, such that the signal 464B may be difficult to filter out.

Figure 5:
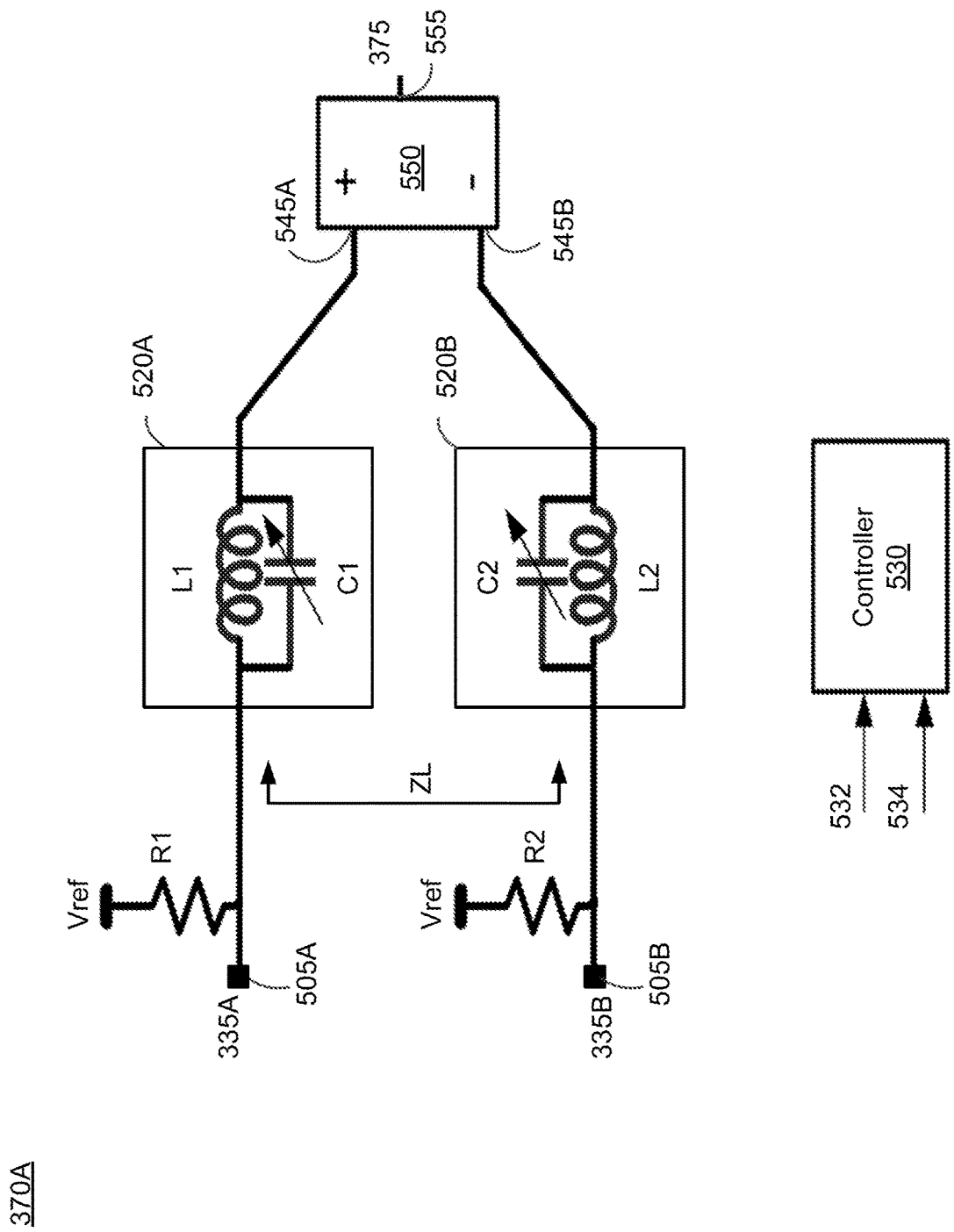
FIG. 5 is a schematic block diagram of an interface circuit including resonating circuits, in accordance with some embodiments.

FIG. 5 is a schematic block diagram of an interface circuit 370A, in accordance with some embodiments. In some embodiments, the interface circuit 370A includes resistors R1, R2, resonating circuits 520A, 520B, a controller 530, and a balun 550. These components may operate together to combine differential signals 335A, 335B, and generate or obtain a single ended signal 375 corresponding to the differential signals 335A, 335B. In some embodiments, the resistors R1, R2, the resonating circuits 520A, 520B, the controller 530, and the balun 550 may be implemented in a single integrated circuit with the DAC circuit 310. In some embodiments, the resistors R1, R2, the resonating circuits 520A, 520B, the controller 530, and the DAC circuit 310 may be implemented as an integrated circuit, where the balun 550 may be implemented as a separate circuit or a separate component (e.g., off-chip component). In some embodiments, the resistors R1, R2, the resonating circuits 520A, 520B, and the balun 550 may be implemented as separate circuits or separate components (e.g., off-chip components) separate from the DAC circuit 310 and the controller 530. In some embodiments, the interface circuit 370A includes more, fewer, or different components than shown in FIG. 5.

In some embodiments, the resistor R1 is a circuit or a component that provides a resistance. In one configuration, a first electrode of the resistor R1 is coupled to the first input port 505A of the interface circuit 370A and a second electrode of the resistor R1 is coupled to a metal rail providing a reference voltage Vref. The first input port 505A may be a pad, a metal rail, or any conductive component that can provide the signal 335A. In some embodiments, the first input port 505A is a bond pad or an output pad of the DAC circuit 310. In this configuration, the resistor R1 may provide a resistance at the first input port 505A of the interface circuit 370A.

In some embodiments, the resistor R2 is a circuit or a component that provides a resistance. In one configuration, a first electrode of the resistor R2 is coupled to the second input port 505B of the interface circuit 370A and a second electrode of the resistor R2 is coupled to a metal rail providing the reference voltage Vref. The second input port 505B may be a pad, a metal rail, or any conductive component that can provide the signal 335B. In some embodiments, the second input port 505B is a bond pad or an output pad of the DAC circuit 310. In this configuration, the resistor R2 may provide a resistance at the second input port 505B of the interface circuit 370A.

In some embodiments, the resonating circuit 520A is a circuit or a component that resonates at a particular frequency. The resonating circuit 520A may include a capacitor C1 and an inductor L1 coupled to each other in parallel between the first input port 505A of the interface circuit 370A and a first input port 545A of the balun 550. In one aspect, the inductor L1 and the capacitor C1 may resonate at an image frequency Fimg to provide a high impedance at the image frequency Fimg. The image frequency Fimg may be a difference between i) a clock frequency Fclk, at which the DAC circuit 310 is clocked, and ii) a RF frequency Fin of the signal 412A for transmitting data. In some embodiments, the capacitor C1 is implemented as a tunable capacitor or a varactor. In one aspect, a capacitance of the capacitor C1 can be adjusted, according to a control signal from the controller 530.

In some embodiments, the resonating circuit 520B is a circuit or a component that resonates at a particular frequency. The resonating circuit 520B may include a capacitor C2 and an inductor L2 coupled to each other in parallel between the second input port 505B of the interface circuit 370A and a second input port 545B of the balun 550. In one aspect, the inductor L2 and the capacitor C2 may resonate at the image frequency Fimg to provide a high impedance at the image frequency Fimg. In some embodiments, the capacitor C2 is implemented as a tunable capacitor or a varactor. In one aspect, a capacitance of the capacitor C2 can be adjusted, according to a control signal from the controller 530.

In some embodiments, the balun 550 is a circuit or a component that converts differential signals into a single ended signal. In one configuration, the balun 550 includes the first input port 545A coupled to the resonating circuit 520A, the second input port 545B coupled to the resonating circuit 520B, and an output port 555 coupled to the PA 380. In this configuration, the balun 550 may obtain an amplitude difference between the differential signals 335A, 335B, and provide the amplitude difference as the single ended signal 375. The balun 550 may provide the single ended signal 375 to the PA 380 at the output port 555.

In some embodiments, the controller 530 is a circuit or a component that generates control signals to configure the resonating circuits 520A, 520B. The controller 530 may be embodied as logic circuits. In some embodiments, the controller 530, the processor 230 and the DAC circuit 310 can be implemented as an integrated circuit. In some embodiments, the controller 530 can be implemented as a separate component (e.g., off-chip component) from the processor 230 and the DAC circuit 310. In some embodiments, the controller 530 receives a frequency select signal 532 and a calibration signal 534. The controller 530 may receive the frequency select signal 532 and the calibration signal 534 from the processor 230 or the DAC circuit 310. In one aspect, the frequency select signal 532 represents or corresponds to the image frequency Fimg. In one aspect, the calibration signal 534 may indicate how to adjust or tune the capacitors C1, C2. In this configuration, the controller 530 may generate control signals, according to the frequency select signal 532 and the calibration signal 534, and provide the control signals to the resonating circuits 520A, 520B to set or adjust capacitances of the capacitors C1, C2. By setting or adjusting capacitances of the capacitors C1, C2, a frequency, at which the resonating circuits 520A, 520B resonate can be set or adjusted.

In one aspect, the resonating circuits 520A, 520B can help suppress intermodulation distortions due to intermodulation of image signals 416A, 416B, and the RF signals 412A, 412B to transmit. As set forth above with respect to FIG. 4, due to non-linearity of the DAC circuit 310 and mismatches or imbalance of generating the signals 335A, 335B, the intermodulation signal 464B may be present at the intermodulation frequency Fim2. In one aspect, the resonating circuits 520A, 520B can resonate at the image frequency Fimg to provide a high impedance at the image frequency Fimg, such that common mode voltages of the image signals 416A, 416B at the image frequency Fimg can be suppressed or reduced, because the amplitude and phase balance of image signals 416A, 416B become much less dependent on the amplitude and phase balance of signals at the input ports 545A, 545B of the balun 550 at the image frequency Fimg. By reducing or suppressing common mode voltages of the image signals 416A, 416B at the image frequency Fimg, the intermodulation signal 464B can be reduced or suppressed.

Figure 6:
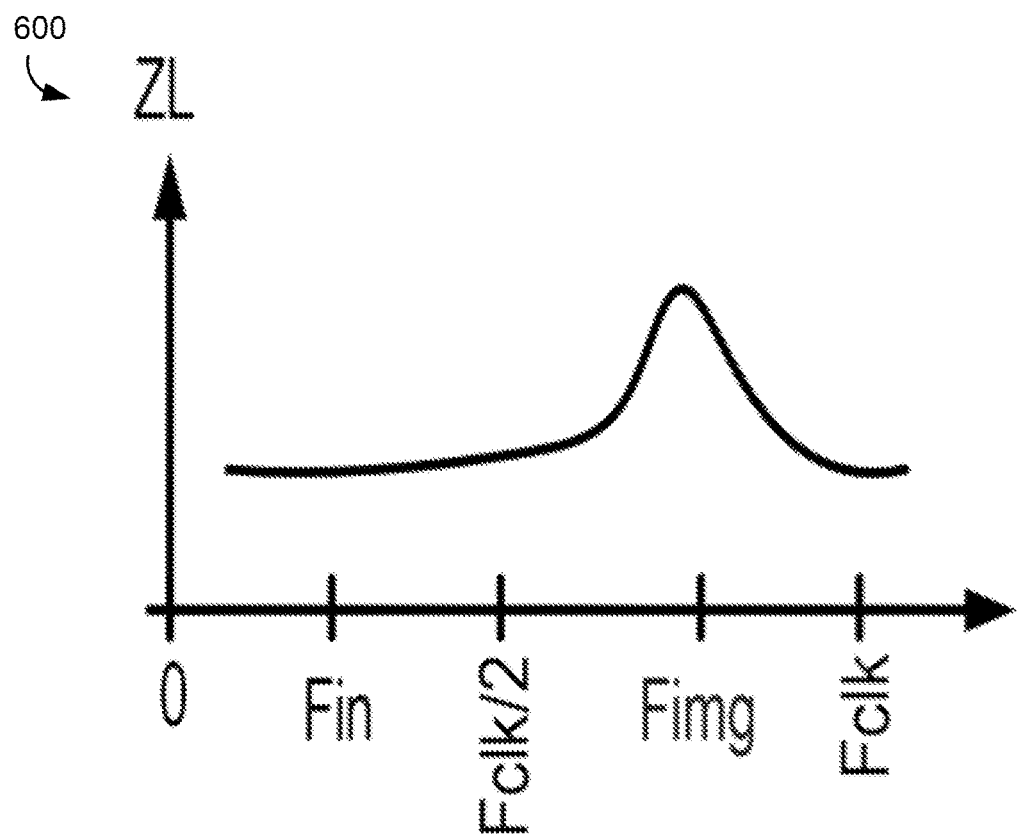
FIG. 6 is a diagram showing a plot of an impedance of input ports of the interface circuit of FIG. 5, in accordance with some embodiments.

FIG. 6 is a diagram showing a plot 600 of an impedance ZL of input ports 505A, 505B of the interface circuit 370A of FIG. 5, in accordance with some embodiments. The impedance ZL may represent an impedance measured at the input ports 505A, 505B towards the resonating circuits 520A, 520B and the balun 550 of the interface circuit 370A. In one aspect, the impedance ZL corresponds to a load impedance of the DAC circuit 310.

In one aspect, the resonating circuits 520A, 520B can selectively provide a high impedance at the image frequency Fimg. As shown in the plot 600, the impedance ZL at the frequencies Fin, Fclk/2 (or half of the clock frequency Fclk), and the clock frequency Fclk may be low or close to resistances of the resistors R1, R2. The impedance ZL at the image frequency Fimg may be higher than at the frequencies Fin, Fclk/2, and the clock frequency Fclk, because the resonating circuits 520A, 520B resonate at the image frequency Fimg.

Figure 7:
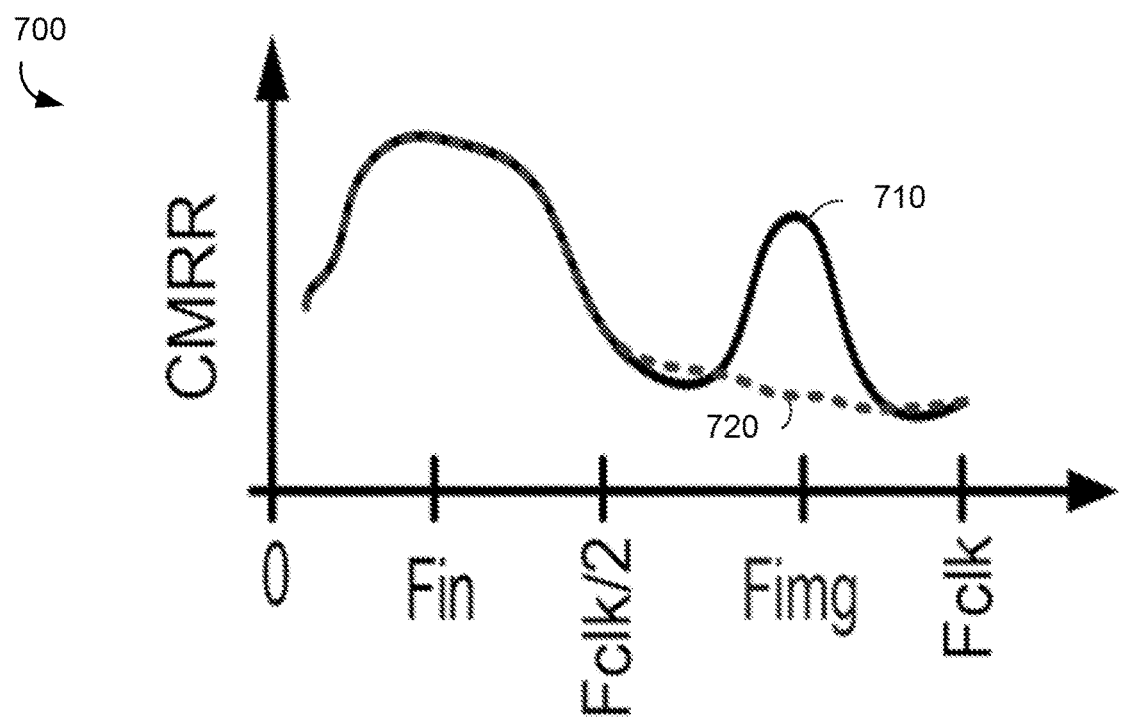
FIG. 7 is a diagram showing a plot illustrating a comparison between a common mode rejection ratio of a transmitter including resonating circuits and a common mode rejection ratio of a transmitter without the resonating circuits, in accordance with some embodiments.

FIG. 7 is a diagram showing a plot 700 illustrating a comparison between a common mode rejection ratio (CMRR) 710 of a transmitter including resonating circuits 520A, 520B and a CMRR 720 of a transmitter without the resonating circuits 520A, 520B, in accordance with some embodiments.

In one aspect, a CMRR indicates how well a common mode voltage of the differential signals 335A, 335B can be rejected. As shown in the plot 700, if the resonating circuits 520A, 520B are not implemented, the transmitter may suffer from a poor CMRR 720 at the image frequency Fimg. By implementing the resonating circuits 520A, 520B, the CMRR 710 can be increased at the image frequency Fimg, because a high impedance can be provided at the image frequency Fimg. By providing the high CMRR 710 at the image frequency Fimg, the intermodulation signal 464B can be reduced or suppressed.

Figure 8:
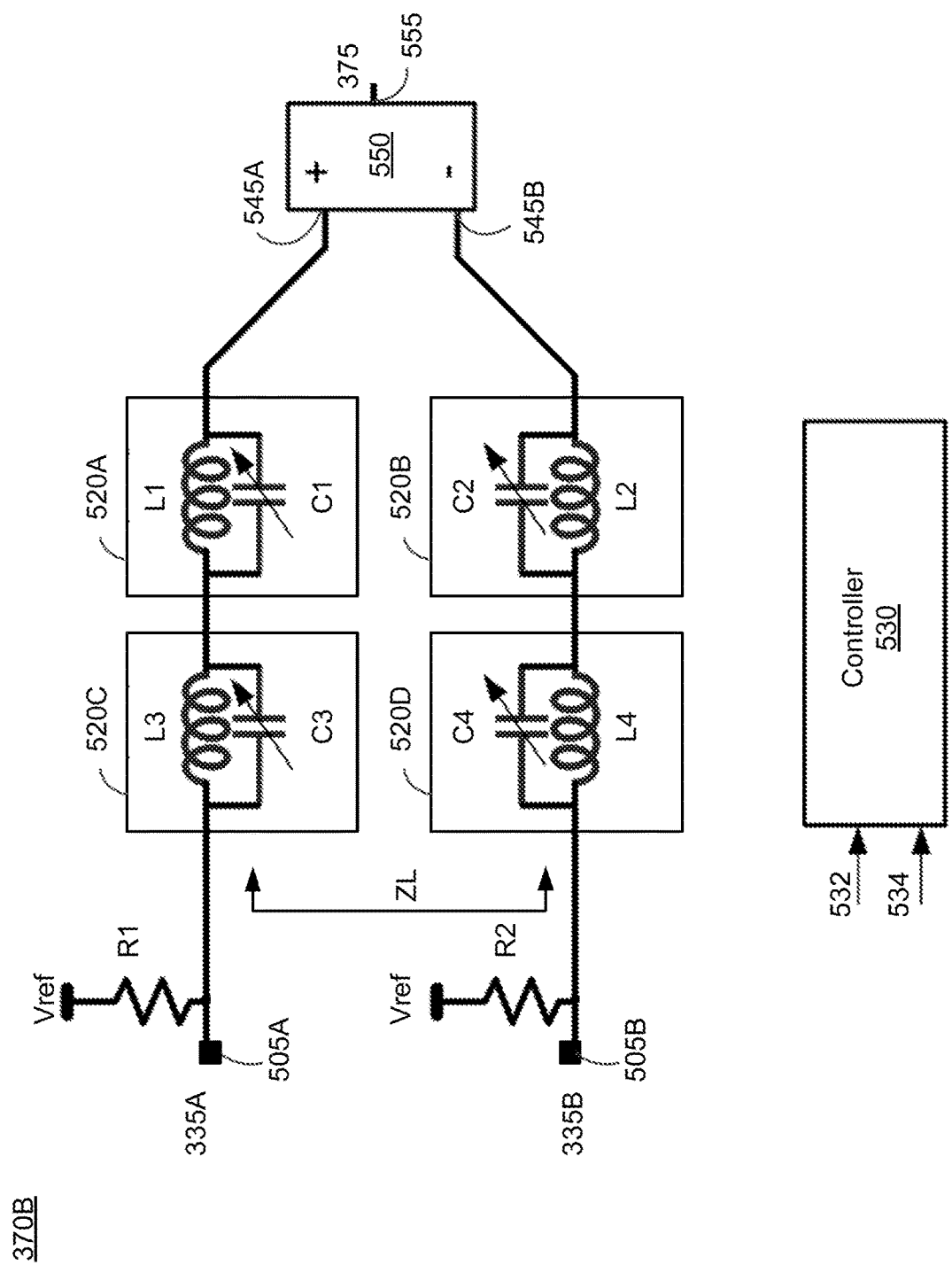
FIG. 8 is a schematic block diagram of an interface circuit including resonating circuits, in accordance with some embodiments.

FIG. 8 is a schematic block diagram of an interface circuit 370B including resonating circuits 520A, 520B, 520C, 520D, in accordance with some embodiments. The interface circuit 370B may be similar to the interface circuit 370A, except the interface circuit 370B additionally includes the resonating circuits 520C, 520D. Thus, detailed description of duplicated portion thereof is omitted herein for the sake of brevity.

In one aspect, the resonating circuit 520C is coupled in series with the resonating circuit 520A between the first input port 505A of the interface circuit 370B and the first input port 545A of the balun 550. The resonating circuit 520C may include an inductor L3 and a capacitor C3 coupled in parallel with each other. In some embodiments, the capacitor C3 is implemented as a tunable capacitor or a varactor. In one aspect, a capacitance of the capacitor C3 can be adjusted, according to a control signal from the controller 530.

In one aspect, the resonating circuit 520D is coupled in series with the resonating circuit 520B between the second input port 505B of the interface circuit 370B and the second input port 545B of the balun 550. The resonating circuit 520D may include an inductor L4 and a capacitor C4 coupled in parallel with each other. In some embodiments, the capacitor C4 is implemented as a tunable capacitor or a varactor. In one aspect, a capacitance of the capacitor C4 can be adjusted, according to a control signal from the controller 530.

In one aspect, the resonating circuits 520A, 520B are tuned to resonate at a first frequency offset from the image frequency Fimg by a first amount, and the resonating circuits 520C, 520D are tuned to resonate at a second frequency offset from the image frequency Fimg by a second amount, where the image frequency Fimg may be between the first frequency and the second frequency. By implementing the resonating circuits 520A, 520B tuned to resonate at the first frequency and the resonating circuits 520C, 520D tuned to resonate at the second frequency, the resonating circuits 520A, 520B, 520C, 520D can provide a high impedance for a wider range than implementing the resonating circuits 520A, 520B. Accordingly, the interface circuit 370B can suppress or reject an image signal for a wider frequency range.

Figure 9:
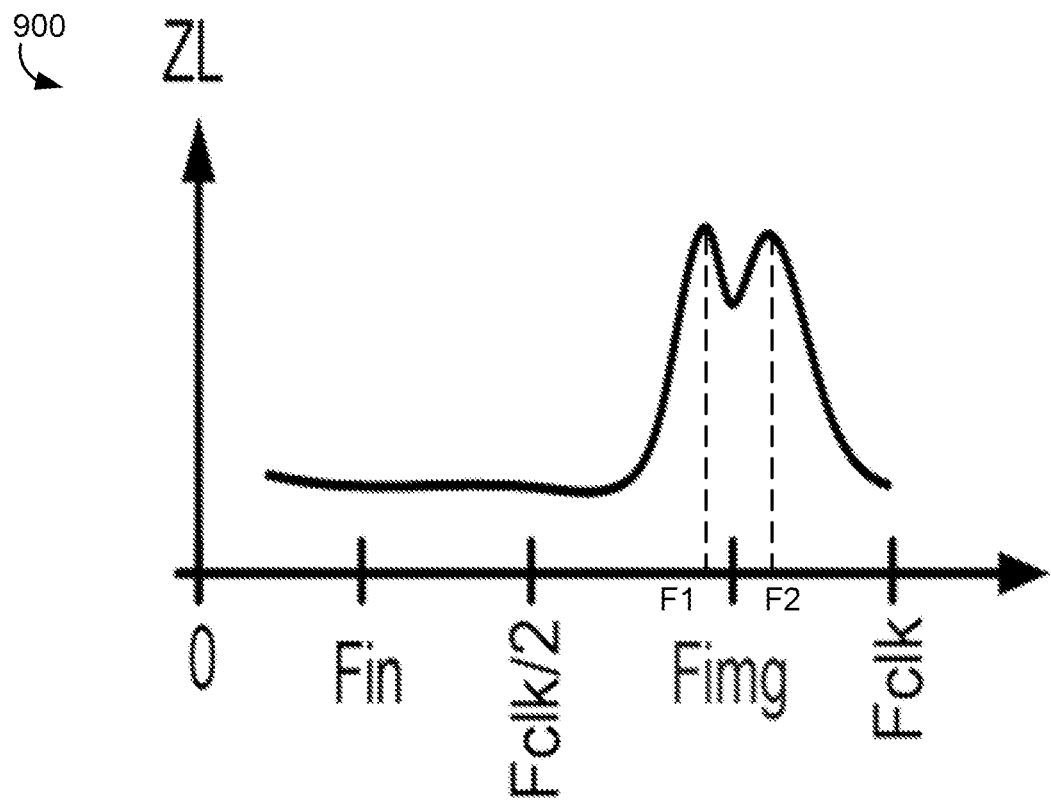
FIG. 9 is a diagram showing a plot of an impedance of input ports of the interface circuit of FIG. 8, in accordance with some embodiments.

FIG. 9 is a diagram showing a plot 900 of an impedance ZL of input ports 505A, 505B of the interface circuit 370B of FIG. 8, in accordance with some embodiments. The impedance ZL may represent an impedance measured at the input ports 505A, 505B towards the resonating circuits 520A, 520B, 520C, 520D, and the balun 550 of the interface circuit 370B. In one aspect, the impedance ZL corresponds to a load impedance of the DAC circuit 310.

In one aspect, the resonating circuits 520A, 520B can resonate to selectively provide a high impedance at a first frequency F1 below the image frequency Fimg, and the resonating circuits 520C, 520D can resonate to selectively provide a high impedance at a second frequency F2 above the image frequency Fimg. Alternatively, the resonating circuits 520A, 520B can resonate to selectively provide a high impedance at the second frequency F2 above the image frequency Fimg, and the resonating circuits 520C, 520D can resonate to selectively provide a high impedance at the first frequency F1 below the image frequency Fimg.

As shown in the plot 900, the impedance ZL at the frequencies Fin, Fclk/2, and the clock frequency Fclk may be low or close to resistances of the resistors R1, R2. The impedance ZL at the frequency F1, the image frequency Fimg, and the frequency F2 may be higher than at the frequencies Fin, Fclk/2, and the clock frequency Fclk, because the resonating circuits 520A, 520B may resonate at the frequency F1, and the resonating circuits 520C, 520D may resonate at the frequency F2 with respect to the image frequency Fimg.

Figure 10:
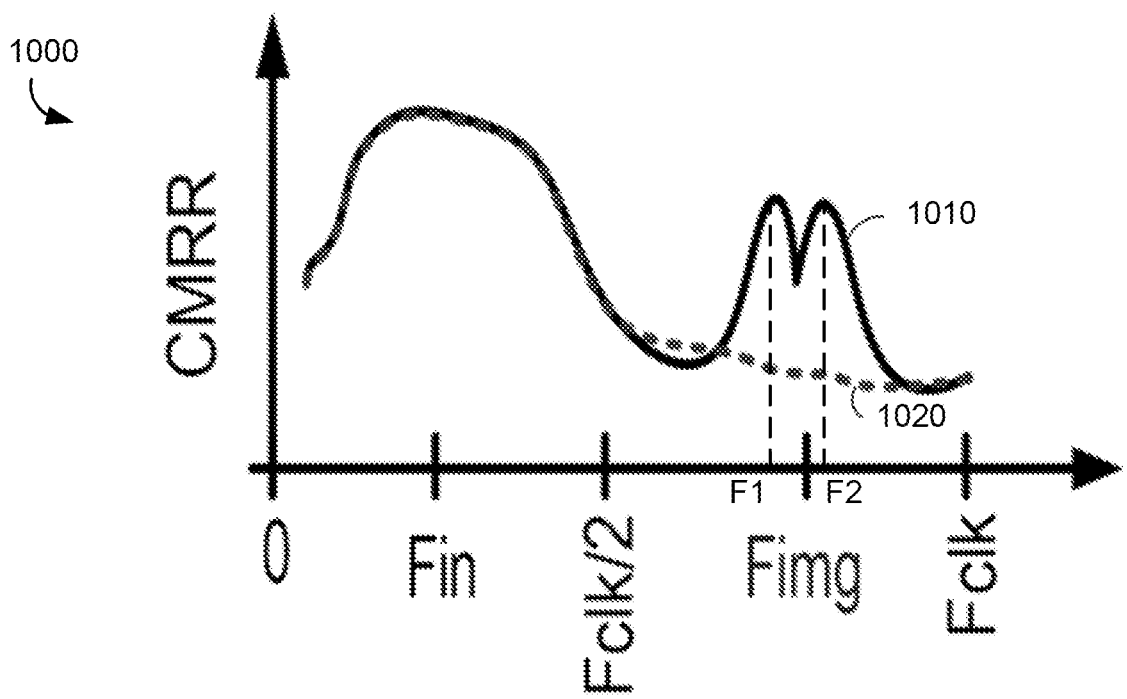
FIG. 10 is a diagram showing a plot illustrating a comparison between a common mode rejection ratio of a transmitter including resonating circuits and a common mode rejection ratio of a transmitter without the resonating circuits, in accordance with some embodiments.

FIG. 10 is diagram showing a plot 1000 illustrating a comparison between a CMRR 1010 of a transmitter including resonating circuits 520A, 520B, 520C, 520D and a CMRR 1020 of a transmitter without the resonating circuits 520A, 520B, 520C, 520D, in accordance with some embodiments.

As shown in the plot 1000, if the resonating circuits 520A, 520B, 520C, 520D are not implemented, the transmitter may suffer from a poor CMRR 1020 at the image frequency Fimg. By implementing the resonating circuits 520A, 520B, 520C, 520D, the CMRR 1010 can be increased at the first frequency F1, the image frequency Fimg, and the second frequency F2, because a high impedance can be provided at the first frequency F1, the image frequency Fimg, and the second frequency F2. By providing the high CMRR 1010 at the first frequency F1, the image frequency Fimg, and the second frequency F2, the intermodulation signal 464B can be reduced or suppressed.

Figure 11:
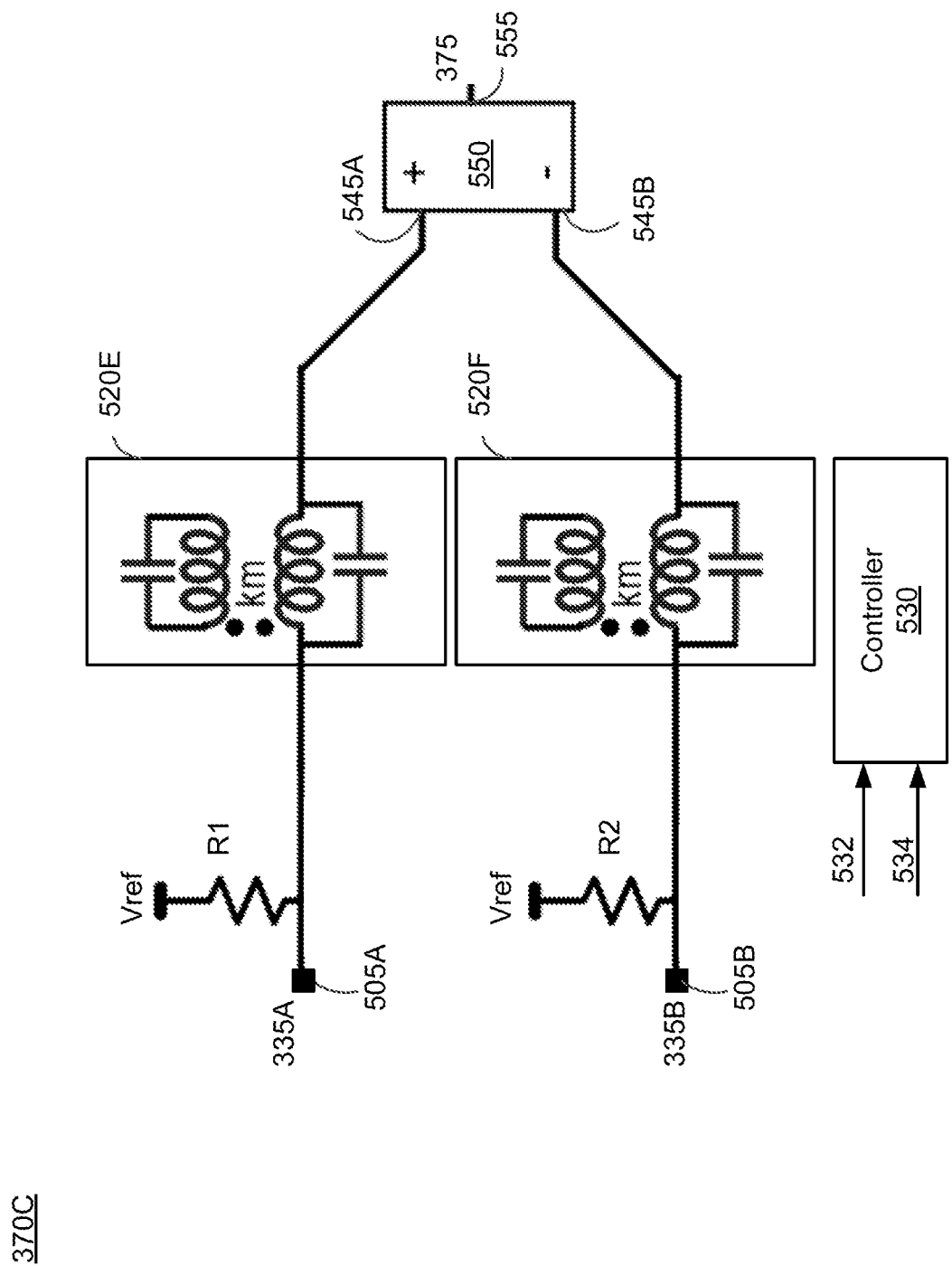
FIG. 11 is a schematic block diagram of an interface circuit including transformers as resonating circuits, in accordance with some embodiments.

FIG. 11 is a schematic block diagram of an interface circuit 370C including resonating circuits 520E, 520F, in accordance with an embodiment. In one aspect, the interface circuit 370C is similar to the interface circuit 370A, except the interface circuit 370C includes resonating circuits 520E, 520F, instead of the resonating circuits 520A, 520B. Thus, detailed description of duplicated portion thereof is omitted herein for the sake of brevity. Each of the resonating circuits 520E, 520F may include a transformer. The transformers can be tuned or set to resonate at a wide range of frequencies (e.g., frequency F1, frequency F2) through mutual coupling of the transformers, such that the interface circuit 370C may have the impedance ZL and the common mode rejection as shown in FIGS. 9 and 10. Accordingly, the interface circuit 370C can suppress or reject an image signal for a wider frequency range.

FIG. 12 is a flow diagram showing operations 1200 of suppressing intermodulation distortion, in accordance with an embodiment. In some embodiments, the operations 1200 are performed by an interface circuit (e.g., interface circuit 370A, 370B, 370B). In some embodiments, the operations 1200 are performed by other entities. In some embodiments, the operations 1200 include more, fewer, or different steps than shown in FIG. 12.

In one approach, the interface circuit receives 1210 first signals (e.g., signals 335A, 335B) for transmission at a first frequency (e.g., RF frequency Fin). The first signals may be differential signals having opposite phases with each other. The first signals may be generated based on a second signal (e.g., clock signal) at a second frequency (e.g., clock frequency Fclk) higher than the first frequency. For example, a DAC circuit 310 may be clocked at the second frequency (e.g., 16~20 GHz) to generate the first signals for transmission at the first frequency (e.g., 400 MHz~7.2 GHz).

In one approach, the interface circuit suppresses 1220 a third signal (e.g., image signal) at a third frequency (e.g., image frequency Fimg). The third frequency may be a difference between the second frequency (e.g., clock frequency Fclk) and the first frequency (e.g., RF frequency Fin). In one aspect, the interface circuit implements one or more resonating circuits (e.g., resonating circuits 520A-

520F) that are set or tuned to resonate at the third frequency. The resonating circuits can resonate at the third frequency to provide a high impedance at the third frequency. By providing a high impedance at the third frequency, intermodulation of the third signal and the first signals can be reduced, such that an intermodulation signal close to the first signal can be reduced or obviated.

In one approach, the interface circuit provides 1230 a fourth signal (e.g., signal 375) at the first frequency (e.g., RF frequency Fin) based on the first signals. In one aspect, the interface circuit implements a balun (e.g., balun 550) configured to convert differential signals into a single ended signal corresponding to the differential signals. For example, the balun may obtain an amplitude difference between the first signals or differential signals, and provide the amplitude difference as the fourth signal. In one aspect, the third signal (e.g., image signal) at the third frequency can be suppressed, such that the fourth signal can be provided without distortion or reduced distortion due to intermodulation between the first signals and the third signal.

The term "coupled" and variations thereof includes the joining of two members directly or indirectly to one another. The term "electrically coupled" and variations thereof includes the joining of two members directly or indirectly to one another through conductive materials (e.g., metal or copper traces). Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A device comprising:
   a first circuit configured to generate a first signal and a second signal at a first frequency, according to a fourth signal at a second frequency higher than the first frequency, the first signal and the second signal having opposite phases with each other;
   a second circuit configured to provide a difference between the first signal and the second signal as a fourth signal;
   a third circuit configured to:
      provide the first signal to the second circuit, and
      resonate at a third frequency between the first frequency and the second frequency; and
   a fourth circuit configured to:
      provide the second signal to the second circuit, and
      resonate at the third frequency.

2. The device of claim 1,
   wherein the first circuit is clocked according to the fourth signal at the second frequency to generate the first signal and the second signal at the first frequency, and
   wherein the third frequency is a difference between the second frequency and the first frequency.

3. The device of claim 1,
   wherein the third circuit includes a first capacitor and a first inductor coupled to each other in parallel to resonate at the third frequency, and
   wherein the fourth circuit includes a second capacitor and a second inductor coupled to each other in parallel to resonate at the third frequency.

4. The device of claim 3, wherein capacitances of the first capacitor and the second capacitor are tunable.

5. The device of claim 1, further comprising:
   a fifth circuit coupled to the third circuit in series between the first circuit and the second circuit, the fifth circuit configured to resonate at a fourth frequency between the first frequency and the second frequency; and
   a sixth circuit coupled to the fourth circuit in series between the first circuit and the second circuit, the sixth circuit configured to resonate at the fourth frequency.

6. The device of claim 5,
   wherein the first circuit is clocked according to the third signal at the second frequency to generate the first signal and the second signal at the first frequency, and
   wherein a difference between the second frequency and the first frequency is higher than the third frequency and lower than the fourth frequency.

7. The device of claim 1,
   wherein the first circuit is a digital to analog converter circuit, and
   wherein the second circuit is a balun.

8. The device of claim 1,
   wherein the third circuit is a first transformer, and
   wherein the fourth circuit is a second transformer.

9. A device comprising:
   a first circuit including:
      a first port configured to provide a first signal at a first frequency, and
      a second port configured to provide a second signal at the first frequency;
   a second circuit including:
      a third port configured to receive the first signal,
      a fourth port configured to receive the second signal, and
      a fifth port configured to provide a third signal corresponding to a difference between the first signal and the second signal;
   a first inductor and a first capacitor coupled between the first port of the first circuit and the third port of the second circuit, wherein the first inductor and the first capacitor are configured to resonate at a second frequency different from the first frequency; and
   a second inductor and a second capacitor coupled between the second port of the first circuit and the fourth port of the second circuit, wherein the second inductor and the second capacitor are configured to resonate at the second frequency.

10. The device of claim 9,
wherein the first circuit is clocked at a third frequency to generate the first signal and the second signal at the first frequency, the third frequency higher than the first frequency and the second frequency, and
wherein the second frequency is a difference between the third frequency and the first frequency.

11. The device of claim 9, further comprising:
a third inductor and a third capacitor coupled between the first port of the first circuit and the third port of the second circuit, wherein the third inductor and the third capacitor are configured to resonate at a third frequency different from the first frequency; and
a fourth inductor and a fourth capacitor coupled between the second port of the first circuit and the fourth port of the second circuit, wherein the fourth inductor and the fourth capacitor are configured to resonate at the third frequency.

12. The device of claim 11,
wherein i) a third circuit including the first inductor and the first capacitor and ii) a fourth circuit including the third inductor and the third capacitor are coupled in series between the first port of the first circuit and the third port of the second circuit, and
wherein i) a fifth circuit including the second inductor and the second capacitor and ii) a sixth circuit including the fourth inductor and the fourth capacitor are coupled in series between the second port of the first circuit and the fourth port of the second circuit.

13. The device of claim 11,
wherein the first circuit is clocked at a fourth frequency to generate the first signal and the second signal at the first frequency,
wherein the fourth frequency is higher than the first frequency, the second frequency, and the third frequency, and
wherein a difference between the fourth frequency and the first frequency is higher than the second frequency and lower than the third frequency.

14. The device of claim 9, wherein the second circuit is a balun.

15. The device of claim 9, wherein the first signal and the second signal have opposite phases with each other and the device is a digital to analog converter in an integrated circuit package.

16. The device of claim 9,
wherein the first inductor and the first capacitor are part of a first transformer, and
wherein the second inductor and the second capacitor are part of a second transformer.

17. The device of claim 9, wherein capacitances of the first capacitor and the second capacitor are adjustable.

18. A device comprising:
a first circuit configured to provide a first signal and a second signal at a first frequency;
a second circuit configured to provide a third signal corresponding to a difference between the first signal and the second signal;
a first inductor and a first capacitor configured to provide the first signal to the second circuit; and
a second inductor and a second capacitor configured to provide the second signal to the second circuit,
wherein the first inductor, the first capacitor, the second circuit, the second inductor and the second capacitor have:
a first impedance at a second frequency higher than the first frequency, and
a second impedance at a third frequency higher than the second frequency, the second impedance higher than the first impedance.

19. The device of claim 18, wherein the first inductor, the first capacitor, the second circuit, the second inductor and the second capacitor have a third impedance at the first frequency, the third impedance higher than the first impedance.

20. The device of claim 18,
wherein the first circuit is clocked at a fourth frequency higher than the third frequency to generate the first signal and the second signal at the first frequency, and
wherein the third frequency is a difference between the fourth frequency and the first frequency.

* * * * *